United States Patent [19]

Newton

[11] 3,776,426
[45] Dec. 4, 1973

[54] ADHESIVE EXTRUDERS

[75] Inventor: Albert E. Newton, Beverly, Mass.

[73] Assignee: USM Corporation, Flemington, N.J.

[22] Filed: Sept. 26, 1972

[21] Appl. No.: 292,420

[52] U.S. Cl. ............... 222/146 HE, 401/1, 219/227
[51] Int. Cl. ............................................. B67d 5/62
[58] Field of Search .................. 222/146; 401/1, 2; 425/202, 87; 259/4, 185; 228/52, 53; 219/420, 421, 422, 423, 424, 425, 426, 427, 230, 227

[56] References Cited
UNITED STATES PATENTS
3,612,357 10/1971 Ruskin .............................. 222/146
3,298,572 1/1967 Newton ............................. 228/53 X Primary Examiner—Robert B. Reeves
Assistant Examiner—Joseph J. Rolla
Attorney—Howard R. Berkenstock, Jr. et al.

[57] ABSTRACT

Apparatus for melting and dispensing heat softenable thermoplastic material such as adhesives, including a main body portion having therein a melting chamber, an inlet passageway leading into one end of the chamber, and a discharge passageway in communication with said chamber and at the other end thereof. The melt chamber has a cross section which progressively diminishes from the inlet end toward the discharge end. The main body portion includes a collecting manifold disposed generally parallel to the melting chamber and opening into the discharge passageway, at the discharge end of the main body portion. A plurality of by-pass conduits disposed in the main body portion and operably connected between the melting chamber and manifold permit the melted thermoplastic material to exit from the melt chamber as it becomes liquefied by passing through the by-pass conduit means and further traversing the collecting manifold to be delivered to the discharge passageway at the discharge end of the melting chamber.

4 Claims, 4 Drawing Figures

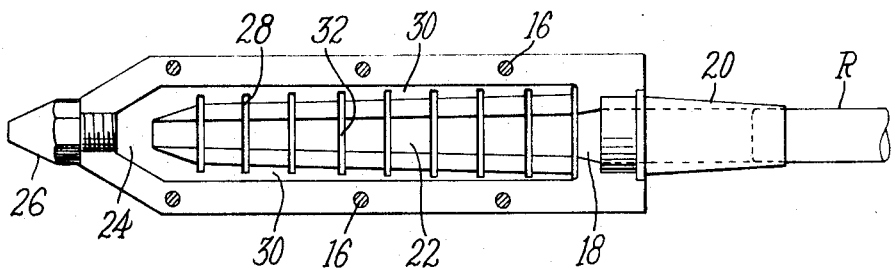
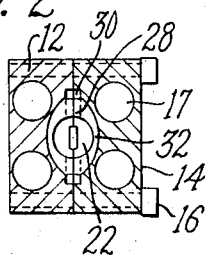
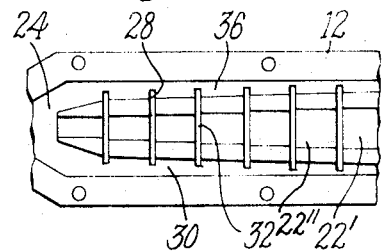
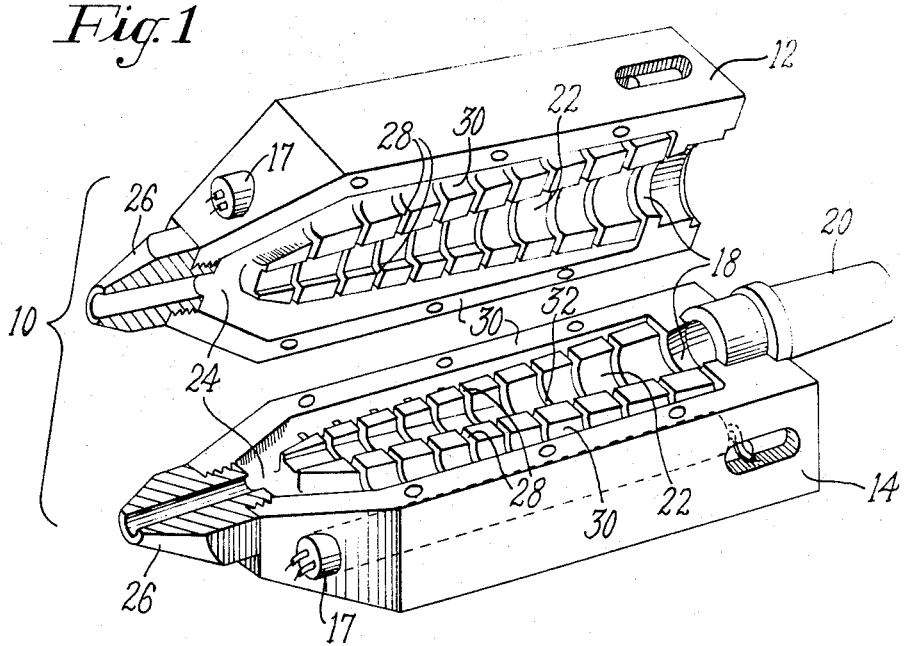

ADHESIVE EXTRUDERS

BACKGROUND OF THE INVENTION

This invention relates to apparatus for melting and dispensing thermoplastic materials such as adhesives known also as hot melt adhesives. As illustrated, the invention relates to apparatus for handling the thermoplastic material received in the form of an elongated, flexible rod, as disclosed, for example, in United States Letters Pat. No. 2,874,084, issued Feb. 17, 1959, in the name of Hans C. Paulsen. The invention disclosed may be utilized in portable hand-operated cement extruding guns such as used for home shop use or light industrial use and disclosed, for instance, in U. S. Pat. application Ser. No. 187,781, filed Oct. 8, 1971, in the names of Richard M. Elliott and Albert E. Newton. The invention may also be adapted to heavier industrial usage by enlarging the melt chamber and by being incorporated into apparatus having a mechanized feed system. Such apparatus is commonly used, for example, in applying adhesives in the manufacture of shoes or in the production of package containers.

Hot melt adhesives offer many advantages because of their freedom from solvents and because of their quick setting characteristics. However, in their heated and melted form some difficulty in handling is encountered. For many reasons, including convenience of adhesive supply and reduced time in which adhesive cement is held at elevated temperatures, the direct feed-through thermoplastic melting and applying systems, such as shown in the above mentioned patent to Paulsen, have found wide favor. Illustrative of the application of such devices to hand held cement adhesive extruders are those further illustrated in U. S. Pat. No. 3,298,572 and U.S. Pat. No. 3,337,093, both issued to Albert E. Newton. In such systems a rod or strand of thermoplastic adhesive is supplied upon demand to the melting chamber. The adhesive is melted within the chamber and is then applied to a receiving surface. The adhesive is forced through the device by the piston like action of the adhesive rod being moved in the melt chamber, as by rotation of feed wheels by other advancing mechanism, forcing the rod or strand of cement into an inlet end of the melting chamber.

While there has been considerable success in providing hand held cement extruders with the through-feed type of melting chambers, there remain significant limitations in the relatively low melting capacity of the melt bodies/chambers in these conventional through-feed devices. Because of this restricted melt capacity, the through-feed devices as embodied in hand held extruders have found limited favor in home usage and virtually no usage in light industrial applications. Further, because of the limited capacity of the existing melt chambers, it is not felt economically feasible to provide a mechanized feed means to advance the rod or strand of thermoplastic adhesive into and through the melt chambers.

As a collateral problem with the existing low capacity melt chambers, there has been a tendency for melted adhesives to be forced back along the inlet passageway or inlet tube during an operator's impatient attempts to overdrive the melt chamber. The present invention overcomes these limitations of the conventional through-feed adhesive extruders by providing a melt chamber having a markedly increased melting capacity for its size to significantly increase the melting of the advancing thermoplastic material without the requirement of raising the melt body temperature above that presently used.

SUMMARY OF THE INVENTION

An extruder is disclosed for melting and dispensing heat softenable thermoplastic material such as adhesives, which, in preferred embodiments, is adapted to be incorporated in a hand held glue gun suitable for home use or industrial application. In accordance with certain features of the invention, the extruder includes a main body portion having therein a melting chamber with inlet passageway means leading into one end of said chamber and discharge passageway means in communication with the other end of said chamber. The melting chamber has a cross-sectional area bounded in the preferred embodiment by a generally rounded perimeter the transverse cross section of which progressively diminishes from the inlet end toward the discharge end. The main body portion also includes a collecting manifold which runs generally parallel to the melting chamber and opening into the discharge passageway means at the discharge end of said melt chamber. The melt chamber and collecting manifold have a plurality of by-pass conduit means operably connected therebetween, whereby the thermoplastic material as it melts during traversing the chamber may exit from the melting chamber, through the by-pass means and be collected in the collecting manifold and thus traverse the manifold to the discharge passageway, advantageously relieving the melting chamber of the liquefied thermoplastic material.

DESCRIPTION OF THE DRAWINGS

FIG. 1 is an exploded perspective view of one embodiment of the invention;

FIG. 2 is a sectional end view of the apparatus of FIG. 1 when assembled;

FIG. 3 is a plan view of one of the blocks illustrated in FIG. 1; and

FIG. 4 is a plan view of an alternate embodiment of the invention.

DESCRIPTION OF THE PREFERRED EMBODIMENT

Referring now to the drawings, the melting device therein illustrated represents a preferred embodiment incorporating the above mentioned features. It comprises a main body portion indicated generally by the reference character 10 (FIG. 1) formed of two elongated rectangularly shaped blocks 12 and 14. Blocks 12 and 14 are formed of a suitable heat conductive material such as aluminum, and are secured together in face to face relationship by means such as screws 16 (FIGS. 2, 3). Heating means 17 (well known in the art) are disposed in blocks 12 and 14.

As shown in FIGS. 1 and 3, blocks 12 and 14 are cut away, forming an inlet passageway 18 within which one end of an inlet sealing device 20 is installed. This device may be similar to the inlet sealing device disclosed in U. S. Pat. application Ser. No. 108,913 filed Jan. 22, 1971, in the name of Albert E. Newton. Axially aligned within the passageway 18 is melt chamber 22. The inlet passageway 18 and the inlet end of melt chamber 22 have a cross-sectional shape and size which are substantially complementary to the cross-sectional shape and size of the thermoplastic material to be axially received therethrough. Continuing longitudinally through melt chamber 22 the cross section of the melt chamber progressively decreases toward the end thereof where the melt chamber opens into a discharge passageway 24. At the discharge end the main body portion 10 is affixed with a discharge nozzle 26 axially aligned with the discharge passageway in the melt chamber. A variety of discharge nozzles are available on the market and details of same are not viewed as critical to this invention.

In the preferred embodiment of the invention illustrated in FIGS. 1 and 3, melt chamber 22 is generally circular in cross section at the inlet end and exhibits a progressively decreasing cross-sectional area from the inlet end through to a rectangular cross section at the discharge end. In this embodiment the diameter of the melt chamber at the inlet end is approximately one-half inch which reduces to approximately 1/16 × ¼ inch rectangular opening at the discharge end.

Complete melting of the advancing adhesive rod may be assured within melt chamber 22 by causing the minimum exit dimension thereof to be approximately 1/16 inch. This value may be the diameter of a circular opening or a width of a rectangular opening. Such dimension minimizes the required heat path through the melting adhesive rod to a value known to provide completely melted adhesive.

The general advantages of the described invention may be accomplished with a circular melt chamber from inlet end to discharge end. However, if the cross section is caused to approach a rectangular configuration at the discharge end, more heated surface area may be exposed to a larger cross section of exiting adhesive. Such increased heat exchange enabling relatively a larger interface between adhesive and chamber 22 may promote an additional melting and through feed capacity in the invention.

Thus, in the illustrated embodiments of FIGS. 1 and 3, melting chamber progressively decreases in cross-sectional area as well as changing its configuration from circular to rectangular from inlet end to discharge end. In an alternative embodiment illustrated in FIG. 4, the cross-sectional shape of the melting chamber 22 is again substantially circular. However, it progressively diminishes in cross-sectional area in a step-wise fashion. That is, the diameter of the melt chamber 22 between adjacent by-pass means 28 (later discussed) remains at a constant value and is progressively decreased by an incremental amount from section to section. In the illustrated embodiment the diameter of the first section 22' adjacent the inlet passageway is approximately one-half inch and at the next adjacent section at 22", the diameter has been decreased to approximately 29/64 inches.

Disposed intermittently and preferably regularly along the melt chamber 22 (such as at one-half inch intervals) from the inlet end to the discharge end are by-pass channels 28. In the embodiments disclosed, these are channels which are radially milled into the block portions 12 and 14 to a depth exceeding the diameter of the melt chamber 22 and are approximately 1/16 inch wide. The by-pass channels 28 extend from within the melt chamber 22 to a collecting manifold 30 which also is an area milled into the blocks 12 and 14. As may be seen from FIGS. 1, 3 and 4, collecting manifold 30 runs generally parallel to melt chamber 22. The chamber may extend axially along one side of melt chamber 22 and may in certain embodiments essentially surround the entire melt chamber 22. In the embodiments illustrated, collecting manifold 30 is defined by two longitudinal slots disposed one on either side (top and bottom) of the existing melt chamber. As may be seen, the cross section of the collecting manifold increases somewhat corresponding to the decrease in the diameter of melt chamber 22 from the inlet end to the discharge end.

In the illustrated embodiments, melting chamber 22 is provided with a grooved-out portion 32 (FIG. 4) substantially around the perimeter thereof. These portions 32 serve as collecting grooves for melted adhesive flowing radially from the chamber 22 to promote removal from the advancing rod. Grooves 32 also enhance the feed of melted adhesive to by-pass channels 28 and on to collecting manifold 30.

As disclosed in certain of the melting adhesive extruders disclosed in the above references, thermostats may be incorporated to maintain the temperature within the melt chamber at a prescribed level.

In operation of the extruder, the thermoplastic material to be melted, such as an adhesive rod R (FIG. 3), is forced through the inlet tube 20, into the inlet passageway 18, and into melt chamber 22. The rod R is closely received in the initial portion of the melting chamber and may come into contact with the sides thereof. Heaters 17 maintain the body 10 at a temperature above the melt temperature of the adhesive. As rod R contacts the walls of chamber 22, melting of the rod R is initiated. As the rod is forced further through melt chamber 22 and the adhesive melts, the liquefied adhesive may escape the melting chamber as by exiting through by-pass channels 28 into collecting manifold 30. It may be seen that since manifold 30 is also within the highly conductive blocks 12 and 14, the thermoplastic adhesive may be maintained in its melted condition within the collecting manifold.

By virtue of the melting of the adhesive from its surface on the advancing rod, it will be appreciated that the cross-sectional area of the advancing rod decreases. Accordingly, the melt chamber of the present invention decreases in the direction of the advancing adhesive to insure that the advancing rod contacts or nearly contacts the heated side walls of the melt chamber 22. By insuring that the melted adhesive exterior is wiped away as the solid rod of cement proceeds through the tapered melt body, fresh unmelted material is effectively exposed to the heated walls of the melt chamber 22. Also, by wiping away the fluid cement, the melted cement and the exposure of each under-layer of non-melted cement to direct contact with the heated internal wall of the melt chamber, interference of the previously melted cement trying to force its way axially down the melt chamber to the nozzle may be avoided. Likewise, the tendency of the melted cement to coat the internal walls of chamber 22 and act as a stagnant insulator prohibiting or impeding the flow of heat into the internal portions of the unmelted rod is also inhibited.

It should be recognized that, since each melted layer of adhesive is quickly wiped or scraped from the advancing rod and sped through by-pass channels 28 and collecting manifold 30 to the discharge area, the melting efficiency of the melting extruder of the present invention has been greatly enhanced.

Regardless of the particular use to which the melting device of this invention is applied (metering of adhesive or other thermoplastics), it enjoys the definite advantages of extreme simplicity coupled with very efficient heating and melting action obtained without any moving parts in the melting chamber. As a result of providing for engagement directly by the solid rod of adhesive with the melting chamber and, in effect, squeezing the rod during its advancement and causing the melted thermoplastic material to be exited from the initial melting area, throughput capacity of the device has been greatly improved. By way of comparison with recent high capacity melting extruders, the present invention provides approximately eight to ten times the volume of melted adhesive at comparable temperatures, melt chamber sizes and feed forces. Thus, it may be recognized that the overall efficiency of the present unit is truly, markedly superior to the recent improved versions referenced above.

Having thus described the invention, what is claimed as new and desired to be secured by United States Letters Patent is:

1. Apparatus for melting and dispensing heat softenable thermoplastic material comprising a main body portion having therein a melting chamber, inlet passageway means leading into one end of said chamber, and discharge passageways means in communication with the other end of said chamber, said melting chamber having a cross section which progressively diminishes from said inlet end toward said discharge end, said main body portion also having a collecting manifold disposed generally parallel to said melting chamber and opening into said discharge passageway means, said melting chamber and said manifold having a plurality of by-pass channel means operably connected therebetween and said walls of said melting chamber including a plurality of transverse collecting grooves disposed for communication at spaced intervals with said by-pass channels whereby, during the melting of said thermoplastic material as it traverses said melting chamber, melted liquefied material may exit from said chamber through said by-pass conduit channels to said collecting manifold and traverse said manifold to said discharge passageway.

2. Apparatus according to claim 1 including a plurality of collecting manifolds disposed generally symmetrically around said melting chamber.

3. Apparatus according to claim 2 wherein said cross section of said melting chamber progressively diminishes along said melting chamber between successive by-pass conduit means.

4. Apparatus according to claim 2 wherein said cross section of said melting chamber between successive by-pass conduit channels remains substantially constant and wherein said cross section of said melting chamber progressively diminishes from section to section.

* * * * *